United States Patent [19]

Nishihara et al.

[11] Patent Number: 4,894,092

[45] Date of Patent: Jan. 16, 1990

[54] PROCESS FOR PREPARING COATED HEAT-RESISTANT PIGMENT

[75] Inventors: Akira Nishihara; Makoto Tsunashima, both of Tokyo, Japan

[73] Assignee: Mitsubishi Kinzoku Kabushiki Kaisha, Tokyo, Japan

[21] Appl. No.: 38,219

[22] Filed: Apr. 14, 1987

[30] Foreign Application Priority Data

Jun. 20, 1986 [JP]  Japan ................................. 61-142811

[51] Int. Cl.$^4$ .............................. C09C 1/10; C08J 7/04
[52] U.S. Cl. ..................................... 106/452; 106/429; 106/447; 106/450; 106/490
[58] Field of Search ................... 106/308 Q, 299, 292, 106/287.1, 287.17, 287.19, 301, 452, 429, 447, 450, 490

[56] References Cited

U.S. PATENT DOCUMENTS

| | | | |
|---|---|---|---|
| Re. 31,602 | 6/1984 | Makinen | 106/300 |
| 3,754,956 | 8/1973 | Durrant | 106/300 |
| 3,905,936 | 9/1975 | Hawthorne | 106/300 |
| 4,275,136 | 6/1981 | Murasawa et al. | 106/308 B |
| 4,325,740 | 4/1982 | Jacobson | 106/300 |
| 4,375,373 | 3/1983 | Abe et al. | 106/308 B |
| 4,699,662 | 10/1987 | Nakada et al. | 106/308 Q |

OTHER PUBLICATIONS

Derwent Abstract, Accession No. 71-71308S/45, Japanese Patent 46005529-A, Apr. 23, 1970.
Derwent Abstract, Accession No. 79-32140B/17, Japanese Patent J54034332-A, Mar. 13, 1979.

*Primary Examiner*—A. Lionel Clingman
*Assistant Examiner*—Christine A. Skane
*Attorney, Agent, or Firm*—Oblon, Spivak, McClelland, Maier & Neustadt

[57] ABSTRACT

A heat-resistant pigment can be produced by forming a dense and uniform coating on the surface of the pigment by contacting said pigment with a metal alkoxide diluted with a water-miscible or semi-water-miscible solvent.

18 Claims, No Drawings

PROCESS FOR PREPARING COATED HEAT-RESISTANT PIGMENT

FIELD OF THE INVENTION

This invention relates to a process for preparing a heat-resistant and chemically stable pigment.

BACKGROUND OF THE INVENTION

It is generally practiced to provide the surface of a pigment to be exposed to high temperatures with a heat-resistant coating. For instance, cadmium pigments discolor and lose their brilliant tint when they are exposed to a temperature as high as 700° C. because cadmium sulfide, their main component, is converted to cadmium sulfate or cadmium oxide. Therefore, cadmium pigments cannot be used for products such as chinaware, tiles, etc., which are fired at a high temperature. In order to improve heat resistance of cadmium pigments, they are coated with silicic acid or a water-insoluble silicate salt.

As methods for surface treatment of pigments to improve their heat resistance, the following are known: (a) Forming a coating by adding a silicic acid salt to the medium in which a pigment is formed as a precipitate and thus producing dispersed fine particles of silica, which settle onto the surface of the precipitate to form a coating; (b) Forming a coating by adding a water-soluble silicate to an aqueous dispersion of a calcined pigment, further adding an acid or a water-soluble salt of an alkaline earth metal, zinc, aluminum, zirconium, etc., and forming silicic acid or a water-insoluble silicate to allow them to settle on the surface of the pigment; etc.

As described above, it was well known that heat resistance of pigments is enhanced by coating the surface thereof with silicic acid or a water-insoluble silicate. However, it is difficult to coat the surface of primary particles uniformly and densely by known methods. The above-mentioned process (a) does not give quite satisfactory heat-resistant pigments. In the above-mentioned precipitation method (b), a coating of silicic acid or water-insoluble silicate is formed on the surface of a pigment by precipitation. Precipitation of silicic acid or a silicate is influenced by many parameters such as temperature, pH, etc., and adjustment of these parameters are required and it is difficult to form uniform and dense coating. The coated cadmium sulfide pigments produced by the conventional precipitation methods suffer conversion of cadmium sulfide to sulfate or oxide when fired at 1150° C. for pigmenting. That is, that the pigments have no sufficient heat resistance and cannot be used as a pigment for the intermediate temperature glaze which acquires chemical stability by firing at not lower than 1150° C.

When heat-resistant coating is formed on the surface of a pigment by a precipitation method, the reaction is conducted at an elevated temperature since the surface activity of the pigment is low at temperatures not higher than room temperature. When the reaction is conducted at an elevated temperature, no dense coating is formed. The reason is surmised to be that rapid hydrolysis causes formed $SiO_2$ to attach itself to the already formed $SiO_2$ molecules rather than the fresh surface of the pigment, and thus the pigment is not coated uniformly and densely.

We unexpectedly found that uniform and dense coating is formed when a hydrophilic pigment is immersed in a mixture of a metal alkoxide such as an alkyl silicate (silicon tetralkoxide) and a water-miscible or semi-water-miscible solvent, uniform and dense coating is formed; and if this procedure is repeated to form a secondary coating over the primarily formed coating, sounder coating is formed and heat resistance and chemical stability are further improved. The formation of the secondary coating can be performed using a metal salt which forms a water-insoluble hydroxide or oxide or a salt pair which form a water-insoluble salt by a double decomposition reaction.

DISCLOSURE OF THE INVENTION

This invention provides a process for preparing a coated heat-resistant pigment comprising: contacting a hydrophilic pigment with a mixture of a metal alkoxide and a water-miscible or semi-water-miscible-solvent to form a primary coating; repeating the above procedure at least once more to form a secondary coating or secondary and further coatings; and collecting the thus coated pigment and drying. It is considered that the thus formed coatings comprise a metal oxide or a hydrated metal oxide in the dried state.

This invention also provides a process for preparing a coated heat-resistant pigment comprising: contacting a hydrophilic pigment with a mixture of a metal alkoxide and a water-miscible or semi-water-miscible solvent to form a primary coating; contacting the resulting coated pigment with an aqueous solution of a metal salt which forms hydroxide or hydrated oxide of the metal by neutralization or a metal salt pair which forms a water insoluble metal salt; and collecting the thus coated pigment and drying. The thus formed secondary coating comprises a water-insoluble metal salt.

The hydrophilic pigment used in the present invention includes tinting pigments such as cadmium pigments, chromium yellow, hydrated iron oxide, ultramarine, etc.; white pigments such as titanium oxide, zinc white, etc.; body pigments such as calcium carbonate, barium sulfate, etc.; and encompasses almost all inorganic pigments. In addition to these inorganic compounds, organic compounds having hydrophilic groups such as $-NH_2$, $-CN$, $-OH$, $-NHCONH_2$ can be used if they are provided with sufficient thermal stability.

The metal alkoxide used in the present invention includes methoxide, ethoxide, propoxide, butoxide, etc. of silicon, aluminum, zirconium, titanium, thorium, beryllium, boron, zinc, barium, tin, rare earth metals, etc. Specific examples are an alkyl silicate such as methyl silicate (silicon tetra methoxide), ethyl silicate (silicon tetraethoxide), etc., zirconium tetraethoxide, zirconium tetrabutoxide, aluminum triethoxide, aluminum triisopropoxide, boron triethoxide, titanium triisopropoxide, etc. Two or more alkoxides can be used as a mixture. By combining alkoxides of different properties, produced coated products can be provided with chemical stability and other desirable characteristics in addition to heat resistance.

The water-miscible and semi-water-miscible solvents to be mixed with the alkoxide include methyl alcohol, ethyl alcohol, propyl alcohol, acetone, acetylacetone, ethyleneglycol, butyl alcohol, methyl acetate, ethyl acetate, methyl ethyl ketone, methyl isobutyl ketone, etc. It is preferred that the proportion of the alkoxide in the mixture is not more than 30% by weight of the solvent when viscosity of the solution, dispersibility of used pigment and development of color are considered.

The amount of alkoxide in the alkoxide solution is such that the alkoxide gives oxide coating of not less than 1.0%, preferably not less than 5% by weight of the pigment to be treated. With less than 1.0% of alkoxide, the surface of pigment is not sufficiently coated and thus sufficiently heat-resistant and chemically stable coated pigment cannot be formed.

It is preferred that the pigment to be treated is immersed in a water-miscible or semi-water-miscible solvent beforehand and then a metal alkoxide is added to the solvent containing the pigment.

In order to promote hydrolysis of the alkoxide, preferably a small amount of water can be added to the alkoxide solution. The amount of the water should be not more than 50% of the used alkoxide.

Further, a catalytic amount of a mineral acid can be added to the alkoxide solution for the same purpose. The mineral acid is preferably added after the hydrolysis has proceeded to some extent.

The secondary coating can be formed by contacting a primarily coated pigment with an aqueous solution of a metal salt which produces a water-insoluble hydroxide or hydrated oxide when neutralized or a metal salt pair which produces a water-insoluble metal salt by a double decomposition reaction.

Examples of the salt which forms an insoluble hydroxide or oxide upon neutralization are sodium silicate, sodium aluminate, aluminum sulfate, zirconium sulfate, zinc sulfate, etc. Examples of salt pairs are sodium silicate and aluminum sulfate, sodium silicate and magnesium chloride, sodium silicate and zinc sulfate, sodium silicate and zirconium chloride, etc. The term "silicate" includes both orthosilicate and meta-silicate.

In the process of the present invention, the contacting of a hydrophilic pigment and an alkoxide and a water-miscible or semi-water-miscible solvent preferably containing a small amount of water is conducted at a temperature of $-10 \sim 80°$ C., preferably at a low temperature of $-10 \sim 10°$ C. at the initial stage. Under such conditions, the reactivities of both the pigment and the alkoxide are controlled, the initial hydrolysis, which is caused by the hydrophilic groups of the pigment and the water adsorbed on the surface of the pigment, proceeds very slowly, and thus coagulation of primary particles is reduced, the metal hydroxide or hydrated metal oxide formed by the hydrolysis deposits and is adsorbed on the surface of the pigment uniformly and sufficiently. At the last stage of the reaction, the reaction mixture can be heated to $40 \sim 80°$ C. in order to shorten the reaction time.

Thereafter, the above-described immersion treatment is repeated to form a secondary coating on the primary coating formed as above.

The method of forming a coating using a metal salt which forms an insoluble hydroxide or oxide or a metal salt pair which forms an insoluble salt is known per se. If desired, a tertiary or a tertiary and further coatings can be formed. By the combination of a plurality of coatings of different compositions, pigments of varied characteristics can be obtained.

Coated cadmium pigments produced by the process of the present invention does not discolor at a temperature as high as 1150° C. Chromium yellow coated with silica by the conventional process discolors in 5-10 minutes at 300° C., while the same pigment coated by the process of the present invention does not discolor for more than 30 minutes.

Titanium oxide pigment coated in accordance with the process of the present invention using zirconium tetraethoxide as an alkoxide has enhanced resistance against visible and UV rays and thus is provided with fastness and weatherability far superior to the untreated pigment.

The coated pigments produced by the process of the present invention are provided with excellent chemical stability, weatherability and thermal stability, and therefore, they are advantageously widely applicable to not only to ceramic products such as porcelain, enamel, etc. as well as paint, ink, plastic, etc. They are especially suitable as coloring agents for ceramics, engineering plastics, etc. wherein superior chemical stability and heat resistance are required.

[Specific Disclosure of the Invention]

The process of the present invention will now be explained in detail with respect to a case in which ethyl silicate is used as an alkoxide and a cadmium pigment is used as a pigment.

A cadmium pigment is immersed in a solution of ethyl silicate in ethanol. A commercially available pigment and ethyl silicate can be used. Ethyl silicate the silica content of which is 28% by weight or 40% by weight can be used. Dimer to hexamer of ethyl silicate, which are formed by addition of a proper amount of water, can also be used.

The amount of the pigment to be added is not more than 30% by weight, preferably 10% by weight of the ethyl silicate solution. The amount of ethyl silicate in the ethyl silicate solution is not less than 2.5% by weight of the pigment for 40% silica content ethyl silicate and not less than 3.6% by weight of the pigment for 28% silica content ethyl silicate.

The immersion of the pigment in the ethyl silicate solution is carried out at $-10 \sim 80°$ C., preferably $-10 \sim 10°$ C. in the initial stage, thereby hydrolysis of the ethyl silicate slowly proceeds, thus hydrolysates and initial condensates deposit and are adsorbed on the surface of the pigment.

The ethyl silicate solution containing the pigment is thoroughly mixed for $1 \sim 2$ hours. The pigment remains immersed for 20 hours or more under slow stirring. Addition of a suitable dispersant or wetting agent such as aminomethylpropanol to the ethyl silicate solution in an amount of not more than 1.0% by weight of the solution will promote dispersion of the pigment.

If the pigment is wetted with ethanol prior to the addition thereof the ethyl silicate solution, and mixed with the solution, the pigment will be easily dispersed in the solution. Or, if the surface of the pigment is wetted with water or moist air and then the pigment is immersed in the ethyl silicate solution at a temperature of $-10 \sim 10°$ C., hydrolysis of ethyl silicate proceeds only on the surface of the pigment, and thus a good silica coating is formed.

In this manner, hydrolysate and condensate of ethyl silicate deposit on the surface of the pigment to form a coating.

Preferably, at this stage water is added to the reaction mixture to further cause hydrolysis of the ethyl silicate so that hydrolysate and condensate of ethyl silicate deposit on the already formed coating. In this case, a catalytic amount of a mineral acid can be added if desired. Also, the reaction mixture can be heated to $40 \sim 80°$ C. at this stage to promote hydrolysis.

The thus treated pigment is separated by filtration. The collected pigment is preferably cured in a humid atmosphere of not lower than 95% RH at a temperature not lower than 50° C. The pigment is then dried, preferably by means of superheated steam.

The thus primarily coated pigment is subjected to the secondary coating procedure in the same manner as the above-described primary coating. In this case, the same alkoxide as used in the primary coating or a separate alkoxide can be used.

Instead of repeating the procedure of the primary coating, the secondary coating can be formed using a metal salt which forms an insoluble hydroxide or oxide by neutralization or a salt pair which forms an insoluble salt by a double decomposition reaction by a conventional process.

The secondary coating is easily formed since the previously formed hydrated metal oxide or metal hydroxide coating provides good affinity to the precipitate to be formed. More than one species of metal salts can be used in combination.

If desired, a tertiary or a tertiary and further coatings can be formed. By the combination of a plurality of coatings of different compositions, pigments of varied characteristics can be obtained.

EXAMPLES 1~21

Pigments were immersed in a solvent as indicated in Table 1 (list of material) and Table 2 (coating steps) and stirred for more than 10 hours. The system was chilled to 020 C. and an alkoxide as indicated in Table 1 in an amount as indicated was added dropwise using a separating funnel. After addition of the alkoxide was finished, the system was stirred at 0° C. for further 20 hours. In some cases, water or water and 1 N hydrochloric acid were added dropwise as indicated in Table 1 and the system was stirred for 2 hours. Thereafter, the system was allowed to stand at room temperature for 20 hours, and then stirred at 60° C. for 1 hour. After cooling, the pigment was collected and air-dried for more than 24 hours.

The thus obtained primarily coated pigment was subjected to the procedure of forming the secondary or secondary and tertiary coatings as indicated in Table 2 (coating steps) in the same manner as the procedure of the primary coating. The thus coated pigments were air-dried, and thereafter further dried at 100° C. for 10 hours and at 200° C. for 3 hours.

The thus prepared coated pigments were added to a low temperature frit glaze (SK 010~01) and an intermediate temperature frit glaze (SK 4~6) as well as a lime glaze (SK 8~9) in an amount of 10% by weight. The mixtures were made into a slurry with addition of a suitable amount of water, and well mixed by a ball mill for 2 hours. The slurry was applied onto the surface of porcelain tiles. The slurry on the tiles was dried well at room temperature, and further dried at 300° C. for 3 hours. The tiles with pigment was heated to 1100, 1200 and 1300° C. over a period of 4~6 hours, and fired at the respective temperature and the colors of the fired glaze were examined.

EXAMPLE 22

Twenty (20) parts by weight of cadmium red was immersed in 90 parts by weight of ethyl alcohol and the mixture was allowed to stand for more than 10 hours. Thereafter, 10 parts by weight of ethyl silicate was added dropwise to the pigment dispersion using a separating funnel, and the dispersion was stirred well for 1 hour. Then 1.7 parts by weight of water and 0.5 part by weight of 1 N hydrochloric acid were added dropwise and stirred well for 2 hours and further stirred for 20 hours. Thereafter, the pigment was collected by filtration and air-dried for 24 hours. Thus a primarily coated pigment was obtained.

Ten (10) parts by weight of the primarily coated pigment was added to a solution of 3 parts by weight sodium metasilicate in 100 parts by weight of water, and the mixture was stirred well for 2 hours. Then 1 N sulfuric acid was added thereto dropwise using a separating funnel so as to adjust pH of the solution to 6.5~7.5 and the resulting mixture was stirred at room temperature for more than 20 hours. Thereafter the thus secondarily coated pigment was collected by filtration, washed with water and air-dried. The pigment was further dried at 100° C. for 10 hours and at 200° C. for 3 hours.

The thus obtained secondarily coated pigment was admixed with frit glazes and a lime glaze and water, and ground well by a ball mill, and the thus prepared slurry was applied on porcelain tiles and discoloration on firing was examined in the same manner as in Examples 1~21.

EXAMPLE 23

On the surface of cadmium red pigment, a primary coating was formed in the same manner as in Examples 1~21. The thus prepared primarily coated pigment was added to a solution of 2 parts by weight of sodium metasilicate in 100 parts by weight of water, and the system was stirred well for 2 hours. Then to this dispersion, a solution of 2.2 parts by weight of aluminum sulfate in 100 parts by weight was added dropwise by means of a separating funnel, thereafter the dispersion was stirred well at 40° C. for 5 hours, and finally boiled for 1 hour for reaction. The pigment was collected by filtration, washed with water, air-dried and finally dried at 100° C. for 10 hours and at 200° C. for 3 hours. The thus prepared secondarily coated pigment was subjected to the firing test for checking discoloration in the same manner as in Examples 1~21.

EXAMPLES 24~26

Employing the combinations of materials and the steps as indicated in Tables 1 and 2, primary and secondary coatings were formed on the surface of the pigments in the same manner as in Examples 1~21 except the procedure of drying. Drying was carried out by air-drying at room temperature for 24 hours, dried at 100° C. for 10 hours and finally at 200° C. for 1 hour.

The thus obtained coated pigments were heated at 300° C. for 30~60 minutes for examination of discoloration.

EXAMPLE 27

Employing the combination of materials and the steps as indicated in Tables 1 and 2, coatings were formed. Fading of color of the thus produced pigment was examined by exposing to rays from a xenon lamp for 1,000 hours.

COMPARATIVE EXAMPLE 1

Ten (10) parts by weight of cadmium red was immersed in 90 parts by weight of ethyl alcohol for more than 10 hours. The system was chilled to 0° C. and 10 parts by weight of ethyl silicate was added thereto dropwise by means of a separating funnel, and the system was stirred at 0° C. for 20 hours. Thereafter, 1.0 part by weight of water and 0.5 part by weight of 1 N hydrochloric acid were added dropwise thereto, and the system was stirred well for 2 hours. Then the system was kept at room temperature for 2 hours and then warmed to 60° C. and stirred at that temperature for 1 hour. After allowed to cool down, the pigment was collected by filtration, air-dried for more than 24 hours, dried at 100° C. for 10 hours and finally at 200° C. for 3 hours. The thus obtained coated pigment was subjected to the firing test for examining discoloration in the same manner as in the working examples.

COMPARATIVE EXAMPLE 2

Ten (10) parts by weight of cadmium red was added to a solution of 3 parts by weight of sodium metasilicate in 100 parts by weight of water and the system was mixed well for 2 hours. Then a 1N sulfuric acid was added dropwise to the system so as to adjust pH thereof to 6.5~7.5. Thereafter the system was stirred well at 40° C. for 5 hours, and further stirred at room temperature for more than 20 hours. Then the pigment was collected by filtration, washed with water, and air-dried for more than 24 hours. The thus obtained primarily coated pigment was subjected to a repetition of the above-described coating procedure to form a secondary coating. The secondarily coated pigment was air-dried, dried at 100° C. for 10 hours and at 200° C. for 3 hours. The obtained coated pigment was subjected to the firing test for examining discoloration in the same manner as in the working examples.

The products of the above Examples 1~23 and comparative examples did not discolor in low temperature firing at 900~1100° C. However, the products of the comparative examples darkened and partially decolored when they were fired at intermediate temperatures of 1100~1200° C. for more than 20 minutes, while the products of the working examples underwent little or no discoloration and maintained brilliant tint. Further, when subjected to high temperature firing at temperatures over 1200° C., which is the firing temperature range for lime glazes, the products of the comparative examples discolored or were decolored, while the products of the working examples suffered only slight discoloration or decoloration, wherein the difference between the working examples and the comparative examples was remarkable.

The products of Examples 24, 25 and 26 did not discolor when they were heated at 300° C. for 30 minutes.

The product of Example 27 did not discolor in the xenon lamp test.

Thus comparison of the working examples and the comparative examples substantiates superior heat resistance and chemical stability of the products of the process of the present invention.

We claim:

1. A process for preparing a coated heat-resistant cadmium-based pigment consisting essentially of:
   (a) contacting a hydrophilic cadmium-based pigment with a mixture of a metal alkoxide selected from the group consisting of an alkoxide of boron, silicon, titanium, zirconium and zinc, and a water-mis-

TABLE 1

| Combination of materials | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Ethyl silicate 28 | 10 | 10 | 10 | 10 | 10 | | | | | | | | | | | | 5 | 8 | 5 | |
| Ethyl silicate 40 | | | | | | 10 | 10 | 10 | 10 | 10 | | | | | | | | | | |
| Methyl silicate | | | | | | | | | | | 10 | 10 | 10 | | | | | | | |
| Zr tetraethoxide | | | | | | | | | | | | | | 10 | 1 | | | 5 | 5 | |
| Ti tetrapropoxide | | | | | | | | | | | | | | | | 10 | | | | |
| Al triethoxide | | | | | | | | | | | | | | | | | 5 | | | |
| B triethoxide | | | | | | | | | | | | | | | | | | 2 | | |
| Methyl alcohol | 90 | 90 | | | | | | | | | 90 | | | | | | | | | |
| Ethyl alcohol | | | 90 | 90 | 90 | 90 | 90 | | | | | 90 | | 90 | 99 | | | 90 | | |
| Propyl alcohol | | | | | | | | | | | | | 90 | | | 90 | | | | 95 |
| Acetyl acetone | | | | | | | | 90 | | | | | | | | | 90 | | 90 | |
| Ethyl acetate | | | | | | | | | 90 | | | | | | | | | | | |
| Ethylene glycol | | | | | | | | | | 90 | | | | | | | | | | |
| Water | 0 | 1.7 | 0 | 2.2 | 1.7 | 0 | 1.7 | 1.7 | 1.7 | 1.7 | 0 | 0 | 1.7 | 1.0 | 0 | 0 | 2.5 | 1.4 | 0 | 0 |
| 1 N HCl | 0 | 0.5 | 0 | 0 | 0.5 | 0 | 0.5 | 0.5 | 0.5 | 0.5 | 0 | 0 | 0.5 | 0.2 | 0 | 0 | 0.5 | 0.4 | 0 | 0 |
| Cadmium red* | 20 | | 20 | 20 | 20 | 20 | 20 | 20 | 20 | 20 | 20 | 20 | 20 | 20 | 25 | 20 | | | | |
| Cadmium yellow* | | 20 | | | | | | | | | | | | | | | | | | |
| Chromium yellow* | | | | | | | | | | | | | | | | | 20 | 20 | 20 | |
| Titanium oxide* | | | | | | | | | | | | | | | | | | | | 20 |

*These terms include primarily coated pigments.

TABLE 2

| Examples | 1 | 2 | 3 | 4 | 5 | 6 | 7 | 8 | 9 | 10 | 11 | 12 | 13 | 14 | 15 | 16 | 17 | 18 | 19 | 20 | 21 | 24 | 25 | 26 | 27 |
|---|---|---|---|---|---|---|---|---|---|---|---|---|---|---|---|---|---|---|---|---|---|---|---|---|---|
| Combination of materials in primary coating | 1 | 2 | 3 | 4 | 5 | 5 | 6 | 7 | 13 | 14 | 14 | 14 | 14 | 14 | 14 | 14 | 14 | 15 | 15 | 15 | 16 | 17 | 18 | 19 | 20 |
| Combination of materials in secondary coating | 14 | 2 | 14 | 14 | 5 | 5 | 7 | 7 | 13 | 1 | 3 | 6 | 8 | 9 | 10 | 11 | 12 | 5 | 15 | 16 | 16 | 17 | 18 | 19 | 20 |
| Combination of materials in tertiary coating | | | | | | 5 | | | | | | | | | | | | | | | | | | | |

Combination of materials is indicated by numbers in Table 1.

cible or semi-water-miscible solvent to form a primary coating;

(b) repeating the above procedure at least once more to form a secondary coating or secondary and further coatings; and (c) collecting the thus coated pigment and drying the same.

2. The process for preparing the coated heat-resistant cadmium-based pigment as set forth in claim 1, wherein the metal alkoxide is selected from the group consisting of methyl silicate, ethyl silicate, zirconium tetraethoxide, zirconium tetrabutoxide, titanium tetraisopropoxide and boron triethoxide and the solvent is selected from the group consisting of methyl alcohol, ethyl alcohol, propyl alcohol, ethyl acetone, ethylene glycol and ethyl acetate.

3. The process for preparing the coated heat-resistant cadmium-based pigment as set forth in claim 1, wherein the pigment is soaked in the solvent before it is contacted with the metal alkoxide.

4. The process for preparing the coated heat-resistant cadmium-based pigment as set forth in claim 1, which further comprises adding water to the alkoxide solution in an amount of up to about 50% by weight of the amount of alkoxide used.

5. The process for preparing the coated heat-resistant cadmium-based pigment as set forth in claim 4, wherein a catalytic amount of mineral acid is added to the alkoxide-solvent mixture.

6. The process for preparing the coated heat-resistant cadmium-based pigment as set forth in claim 5, wherein the addition of water and the mineral acid is effected after the reaction has proceeded to some extent.

7. The process for preparing the coated heat-resistant cadmium-based pigment as set forth in claim 1, wherein the contacting of the pigment and the alkoxide-solvent mixture is effected at a temperature between $-10°$ C. and $10°$ C.

8. The process for preparing the coated heat-resistant cadmium-based pigment as set forth in claim 1, wherein the reaction mixture is warmed to 40 to 80 ° C. in the later stage of the reaction.

9. The process for preparing the coated heat-resistant cadmium-based pigment as set forth in claim 1, wherein said water-miscible solvent is a solvent selected from the group consisting of methyl alcohol, ethyl alcohol, propyl alcohol, acetone, acetylacetone, ethylene glycol, butyl alcohol, methyl acetate, ethyl acetate, methyl ethyl ketone and methyl isobutyl ketone.

10. A process for preparing a coated heat-resistant cadmium-based pigment comprising:

(a) contacting a hydrophilic cadmium-based pigment with a mixture of a metal alkoxide selected from the group consisting of an alkoxide of boron, silicon, titanium, zirconium and zinc, and a water-miscible or semi-water-miscible solvent to form a primary coating;

(b) contacting the resulting coated pigment with an aqueous solution of a metal salt which forms a hydroxide or hydrated oxide of the metal by neutralization or a metal salt pair which forms a water-insoluble metal salt; and (c) collecting the thus coated pigment and drying the same.

11. The process for preparing the coated heat-resistant cadmium-based pigment as set forth in claim 10, wherein the metal alkoxide is selected from the group consisting of methyl silicate, ethyl silicate, zirconium tetraethoxide, zirconium tetrabutoxide, titanium tetraisopropoxide, and boron triethoxide and the solvent is selected from a class consisting of methyl alcohol, ethyl alcohol, propyl alcohol, acetylacetone, ethyleneglycol and ethyl acetate, and the metal salt is sodium metasilicate or the metal salt pair is sodium metasilicate and aluminum sulfate.

12. The process for preparing the coated heat-resistant cadmium-based pigment as set forth in claim 10, wherein the pigment is soaked in the solvent before it is contacted with the metal alkoxide.

13. The process for preparing the coated heat-resistant cadmium-based pigment as set forth in claim 10, wherein not more than 50% of the used alkoxide of water is added to the alkoxide-solvent mixture.

14. The process for preparing the coated heat-resistant cadmium-based pigment as set forth in claim 13, wherein a catalytic amount of mineral acid is added to the alkoxide-solvent mixture.

15. The process for preparing the coated heat-resistant cadmium-based pigment as set forth in claim 14, wherein the addition of water and the mineral acid is effected after the reaction has proceeded to some extent.

16. The process for preparing the coated heat-resistant cadmium-based pigment as set forth in claim 10, wherein the contacting of the pigment and the alkoxide-solvent mixture is effected at a temperature between $-10°$ C. and $10°$ C.

17. The process for preparing the coated heat-resistant cadmium-based pigment as set forth in claim 10, wherein the reaction mixture is warmed to 40 to 80° C. in the later stage of the reaction.

18. The process for preparing the coated heat-resistant cadmium-based pigment as set forth in claim 10, wherein said water-miscible or semi-water-miscible solvent is a solvent selected from the group consisting of methyl alcohol, ethyl alcohol, propyl alcohol, acetone, acetyl acetone, ethylene glycol, butyl alcohol, methyl acetate, ethyl acetate, methyl ethyl ketone and methyl isobutyl ketone.

* * * * *